INVENTOR
Thomas J. Hennigan
Nelson H. Potter &
Kenneth O. Sizemore

BY

ATTORNEYS

United States Patent Office 3,426,263
Patented Feb. 4, 1969

3,426,263
METHOD AND APPARATUS FOR BATTERY CHARGE CONTROL
Thomas J. Hennigan, West Hyattsville, Nelson H. Potter, Berwyn Heights, and Kenneth O. Sizemore, District Heights, Md., assignors to the United States of America as represented by the Administrator of the National Aeronautics and Space Administration
Filed May 13, 1966, Ser. No. 549,860
U.S. Cl. 320—23    4 Claims
Int. Cl. H02j 7/04; H01m 45/04

ABSTRACT OF THE DISCLOSURE

A battery charging system capable of maintaining cell-to-cell voltage balance by first limiting the charging voltage to a first predetermined level and thereafter, through the performance of a control circuit cooperating with the battery, limiting the charging voltage to a second predetermined lower level. The magnitude of the second predetermined level voltage is chosen to be sufficient to keep the battery charged yet insufficient to keep the battery charged yet insufficient to cause any damage to the battery.

---

The invention described herein was made by an employee of the United States Government and may be manufactured and used by or for the government for governmental purposes without the payment of any royalties thereon or therefor.

The invention described herein relates to battery charge controls and more particularly to a method and apparatus for monitoring the battery's charging current and reducing its charging voltage when the battery current reduces to a predetermined value so that the battery is prevented from being overcharged.

The development of equipment suitable for use at remote locations has resulted from the endeavors of modern electronic technology. One example of such equipment is spacecraft, either earth orbiting or interplanetary; another example is weather measuring at remote locations. One major difficulty affecting remote electronic equipment is concerned with the provision of a source of electric power. Various limitations affect the type of power sources that may be used. Size and weight limitations make it impossible to use a large and bulky battery as a source of electric power on a spacecraft. Other types of power sources require fuel which also increases the related structure's weight and size. Further, when the fuel supply is exhausted the electric power ends. To alleviate the size, weight, and fuel problems other sources of electric power have been developed such as solar cells and thermal electric converters, for example. However, these power sources have their own problems. Specifically, they only generate power during certain periods of an orbit. Further, they have limited output capabilities. That is, they only generate power when they are in the solar radiation field, and they only generate a small amount of power. These limitations require a storage reservoir both to provide power when the sources are not able to supply power and to provide higher power during peak periods. For these reasons, as well as others, batteries that can be recycled have been developed to store the energy generated by these lightweight power sources; sealed silver cadmium and silver zinc cells are examples of these types of batteries.

While these recently developed batteries can be advantageously recycled for extended periods of time certain disadvantages have been observed. One problem is the internal gas buildup when sealed cells of this type are overcharged. For example, a 5-ampere-hour silver cadmium battery having a nominal charge voltage of 1.5 volts will liberate oxygen when charged to 1.55 volts and will liberate hydrogen when charged to 1.7 volts. When sufficient internal cell pressure is built up the cell will rupture resulting in permanent damage. It will be appreciated how objectionable this disadvantage is when a battery is used on a spacecraft.

While it is relatively simple to limit the charge voltage on a single cell by strictly limiting the voltage applied, it is difficult to limit the charge voltage on a plurality of cells connected in series. A plurality of cells connected in series and charged their full series potential will result in varying potentials on the individual cells. That is, the first cell may be undercharged, the second cell may be fully charged and the third cell may be overcharged. Hence, this cell unbalance may result in one cell of a series building up internal gas pressure and exploding due to its overcharge condition. The rupture of one cell in the series ruins the whole series as a source of power.

The prior art has attempted to solve this overcharge problem by first charging at a high current rate and then reducing the charging rate to a trickle rate. U.S. Patent 3,160,805 to Lawson et al., describes such a system. However, these systems have not proven to be entirely satisfactory. They do not actually reduce the possibility of overcharge, they only allow a longer time period to occur before overcharge comes about.

Whil the herein described invention has particular utility in spacecraft it is not limited thereto. The invention is generally useful controlling the charging of batteries of the sealed silver cadmium or silver zinc type. The peculiar advantages of the invention make it readily adaptible for automatic recharge control without the necessity for an operator to continuously observe the recharge condition of the batteries. The invention may be used to control charging during one period of time where the recharged battery is then discharged during a second period of time. For example, the invention can be used to control the charging of batteries for a walkie-talkie to be latter utilized by police or firemen. Or, the invention can be used to control the charging of batteries for test equipment located at remote points, such as on a mountain top. Specifically, the batteries can be recharged from solar cells during the daylight hours and utilized to conduct measurements during the night hours. Hence, the batteries can be easily accessible or located at remote points.

It is an object of this invention to provide a battery charge control system that prevents the overcharge of a rechargeable battery.

It is also an object of this invention to provide a method and apparatus for preventing the overcharge of a plurality of rechargeable cells connected in series.

It is a further object of this invention to provide a method and apparatus for preventing the overchage of a plurality of serially connected rechargeable cells thereby preventing the internal buildup of gas pressure.

It has been observed that the rate of current flow into a rechargeable battery from a voltage source drops significantly when the battery nears its fully charged state. It has been further observed that a battery can be maintained near full charge without becoming overcharged, by dropping the charging voltage to a value somewhat below its normal charging voltage. It is upon these particular phenomena that the invention depends.

In accordance with a principle of the present invention a method of preventing the overcharge of a battery is provided by detecting the battery charge curent and reducing charge voltage when said battery current reduces to a predetermined value. The battery charge current is the rate of current flow into the battery from the recharge power source, the charge voltage is the voltage applied to the battery by the recharge power source, the predetermined value to which the charge current drops is a value that occurs when the battery is near full charge, and the value to which the charge voltage is dropped is a value that is low enough to prevent the battery from becoming overcharged but high enough to maintain almost full charge on the battery.

In accordance with a further principle of the invention an apparatus for carrying out the foregoing method is provided by connecting a current sensor in series with the battery and connecting a shunt voltage regulator across this series combination. The current sensor is adapted to sense the current flow into the battery and to provide an output signal when said current drops to the aforedescribed predetermined value. This output signal, through appropriate means, is adapted to control the voltage regulator. That is, the output signal tells the voltage regulator to drop the voltage applied to the battery. Because this output signal occurs when the battery is near full charge and because the applied voltage is now of sufficient value to maintain near full charge but not of sufficient value to create an overcharge condition the battery is in its best possible state.

It will be appreciated that this system is simple and uncomplicated in operation and results in battery recharging but prevents battery overcharge and its inherent problems.

The foregoing objects and many of the attendant advantages of the invention will become more readily appreciated as the same becomes better understood by reference to the following detailed description when taken in conjunction with the accompanying drawings wherein.

The method of the invention depends upon the observation that the rate of charge for charging rechargeable batteries drops significantly when the batteries approach full charge. The method also depends on the further observation that if the charge voltage is dropped the batteries will not become overcharged but will maintain an almost full charge value. In accordance with a preferred embodiment of the apparatus of the invention this reduction in charge current is sensed and through appropriate means is utilized to reduce the charge voltage. The reduction of the charge voltage then prevents overcharge.

Figure 1:
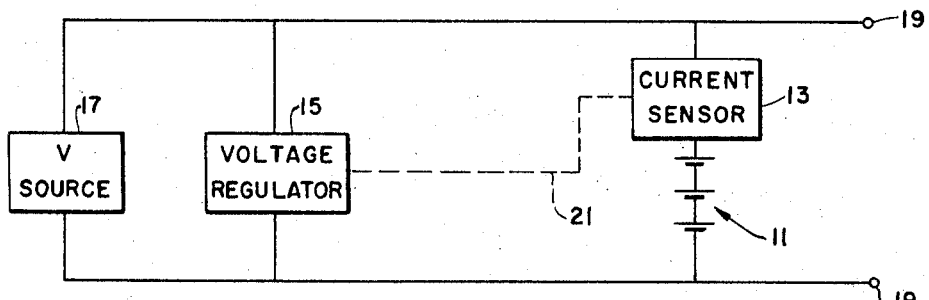
FIG. 1 is a block diagram illustrating a suitable apparatus for carrying out the general method of the invention.

FIG. 1 illustrates a general apparatus for carrying out the method of the invention and comprises a plurality of series connected battery cells 11, a current sensor 13, a voltage regulator 15, and a charge source 17. The output from the charge source 17 is connected to the input of the voltage regulator 15. The voltage regulator is connected across a series combination of the current sensor 13 and the plurality of cells 11. A pair of terminals 19, connected across the series combination of the current sensor and the plurality of cells are adapted for connection to a load. A control 21 is illustrated from the current sensor to the voltage regulator 15.

The charge source 17 could be a solar cell array, for example. However, more generally the source 17 is merely any power source adaptable for use as a source of charge voltage for the battery 11.

In operation during a charging cycle, the voltage source applies a voltage to the battery 11 and the current sensor 13 detects the rate of charge being applied to the battery. As noted above, this charge rate reduces significantly as the battery 11 nears its fully charged state. This significant reduction in battery current is sensed by the current sensor which provides an output through control 21 to reduce the charging voltage by signalling the voltage regulator to regulate at a lower voltage. This reduction in voltage prevents the battery from becoming overcharged by preventing the series combination of cells from reaching an unbalance condition. That is, it prevents one cell in the series from being overcharged and a second cell in the series from being undercharged. This then prevents destruction of the series combination which would occur if an overcharged cell ruptured due to internal gas pressure; the internal pressure building up because of overcharge.

For example, if the battery 11 is composed of 13 series connected 1.5 volt, 5 ampere-hour silver cadmium sealed cells with a nominal voltage rating of $13 \times 1.5$ or 19.5 volts and 19.5 volts is applied for an extended period of time, some of these cells will become overcharged. This overcharge will cause excessive gas buildup. Further, due to slight differences in the cells, the cells reach full charge at different times. This difference forces those cells that reach full charge first to go into overcharge creating an unbalance between the individual cells. This unbalance results in the overcharged cells building up excessive internal pressure and leads to the further result that these cells may rupture. However, it has been found that if the charge voltage is reduced to 18.3 volts (1.41 volts/cell open circuit voltage) near the time the series cells become fully charged this situation will not occur; moreover, the cells will not significantly lose their acquired strength. It has also been found that the charge rate of the cells reduces to about 50 milliamperes when these cells are charged to about 95% of their rated capacity by a 19.5 volt source. Hence, when the rate reduced to this value the charge voltage was reduced and an overcharge was prevented. It is to be understood that the voltage values used in this and other examples are not to be considered limiting; they are merely examples of systems which have operated satisfactorily over extended periods of time.

Figure 2:
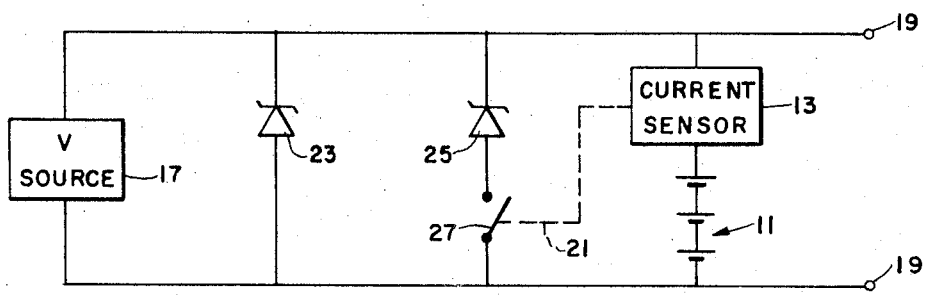
FIG. 2 is a schematic diagram partially in block form illustrating an apparatus for carrying out the invention.

FIG. 2 illustrates one simple means for carrying out the method of the invention. FIG. 2 is similar to FIG. 1 with the exception of a first Zener diode 23, a second Zener diode 25, and a controllable switch 27 which replaces FIG. 1's voltage regulator 15. The first Zener diode 23 is connected across the recharge source 17; and the second Zener diode 25 is connected in series with the controllable switch 27. This series combination is also connected across the recharge source 17. Hence, the voltage source; the first Zener diode; the series combination of the second Zener diode and the controllable switch; and the series combination of the current sensor and the battery 11 are all connected in parallel.

In operation, charge source 17 charges battery 11 until such time as the increasing battery voltage reaches the breakdown value of the first Zener diode 23. When this happens, the voltage applied to battery 11 from charge source 17 is limited, thereby resulting in a gradual reduction in battery current. The current sensor 13 senses this gradual reduction in current, and, at a predetermined value, closes the controllable switch 27 through the operation of control 21. This closure provides a parallel path through the second Zener diode 25; the breakdown value of the second Zener diode is lower than the breakdown value of the first Zener diode. This lower breakdown value is high enough to allow near full charge on the batteries 11 but low enough to prevent overcharge. Hence, this second path limits the battery voltage and thereby prevents the overcharge of the battery 11. Taking the prior example of 13 5 ampere hour silver cadmium cells having an overall nominal voltage of 19.5 volts, the first Zener diode then has a breakdown voltage of 19.5 volts to charge the batteries at their nominal voltage value. When the current sensor senses that the current has reduced to about 50 ma., i.e. the batteries at 95% of their full charge value, it signals the switch 27 to close. This closure switches the second Zener diode into the circuit. This diode has a breakdown voltage of 18.3 volts and therefore reduces the charge voltage to 18.3. As more fully illustrated above, this voltage has been found to maintain almost full charge on these batteries but prevent overcharge from occurring.

Figure 3:
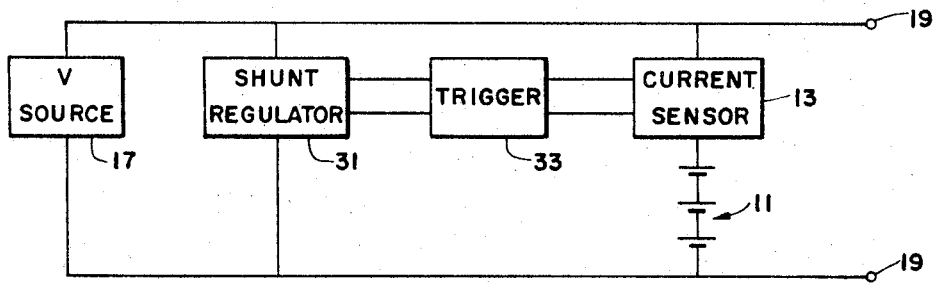
FIG. 3 is a block diagram illustrating another apparatus for carrying out the invention.

FIG. 3 illustrates a second apparatus for carrying out the invention that is somewhat similar to FIG. 2. The difference includes a general block diagram illustrating a shunt regulator 31 in place of the plural Zener diodes and a trigger 33 as the control. The shunt regulator and the series combination of the current sensor and the battery 11 are connected in parallel across the output of the charge source 17. The output from the current sensor is connected to the input of the trigger 33 and the output from the trigger is connected to the shunt regulator 31.

In operation, the current sensor senses the current applied to the battery 11 and the trigger is operative in response to the output from the current sensor to provide a trigger voltage to the shunt regulator when the current reduces to a predetermined value. The shunt regulator then reduces the voltage applied to the battery by diverting some of the charge current from going to the battery.

Figure 4:
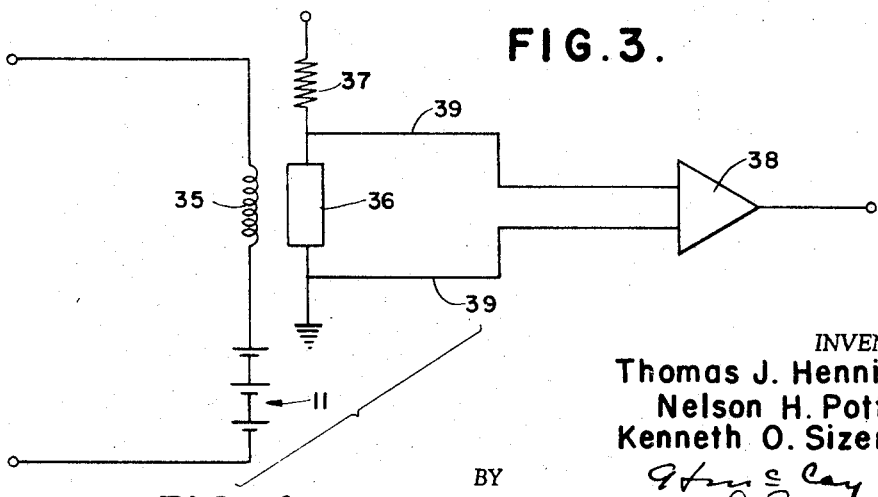
FIG. 4 is a schematic diagram of a current sensor that is suitable for use with the apparatus of the invention.

FIG. 4 illustrates one type of current sensor which meets the requirements of the invention but does not form a part of the invention. FIG. 4 comprises an inductor 35, a Hall type resistor 36, a resistor 37, and an amplifier 38. The inductor 35 is connected in series with the battery 11; and the Hall type resistor 36 is mounted in close proximity to the inductor.

A Hall type resistor is a variable resistor wherein the resistance varies in accordance with the magnitude of a magnetic field occurring along the magnetic axis of the Hall resistor. Specifically its resistance decreases when the intensity of the magnetic field along its magnetic axis decreases.

The Hall resistor 36 is connected in series with the resistor 37 and between a voltage source V and ground. This connection forms the Hall resistor 36 and the resistor 37 into a voltage divider. A pair of wires 39 connect the amplifier 38 across the Hall resistor 36; hence, the input to the amplifier varies in accordance with the voltage drop across the Hall resistor. Further, the Hall resistor is mounted so that the magnetic field of the inductor will control its resistive value. Consequently, when the current through the inductor drops the resistance of the Hall resistor drops and the input to the amplifier is decreased. The input is decreased because, through conventional voltage divider action, the voltage drop across the Hall resistor decreases when its resistance drops. Hence, the current through the inductor controls the output of the amplifier in a direct manner. Further the current through the inductor drops when the battery 11 nears full charge. Therefore, when the battery 11 nears full charge the output voltage from the amplifier will decrease.

The output voltage from this sensor circuit could be used to operate a Schmitt trigger; and output from the Schmitt trigger could operate a shunt regulator. Or, the output voltage could operate a relay adapted to close a controllable switch such as 27 in FIG. 2. Or the output voltage could be used to control one input of a differential amplifier in a conventional shunt voltage regulator. In the general case the signal is utilized to control a means to reduce the applied voltage to perform the method of the invention. The reduced charging voltage prevents the overcharge of the batteries being recharged.

The circuit illustrated in FIG. 4 is only one of a number of different systems that could be utilized to provide this function. For example, a resistor could be connected in series with the batteries with the output from the resistor being applied to the base of a transistor. When the current drops the transistor base voltage would drop turning it off. A relay could be coupled to the output from the transistor; de-energization of the transistor would de-energize the relay. This de-energization would cause a switching to reduce the applied voltage.

It will be appreciated by those skilled in the art and others that the device is simple and uncomplicated but provides a means for preventing overcharge. While the invention has illustrated the battery 11 as a plurality of series connected cells, it will be further appreciated, that the invention is also applicable to a single cell. The charging current of a single cell reduces in a manner similar to a plurality of cells connected in series. The value to which it reduces when the cell reaches full charge is dependent upon the type of cell involved.

Further, while the invention has been described in a preferred form there is other apparatus which will meet the requirements of the invention. For example, the voltage regulation has been illustrated in FIGS. 2 and 3 as a shunt type of regulation; however, series regulation can also be used. All that is necessary is that the current sensor be adapted to generate an output signal that can be used by the regulator to control the regulation. The controlled regulation must provide a reduction in the charge voltage upon the predetermined reduction in charge current. Consequently, it is to be understood that within the scope of the appended claims, the invention may be practiced otherwise than as specifically described herein.

What is claimed is:

1. Apparatus for controlling the charging of a battery comprising:
   current sensing means connected in series with said battery for sensing the rate of charge applied to said battery and generating an output signal in accordance therewith;
   a charge source shunting the series combination of said current sensing means and said battery;
   voltage regulator means shunting said charge source for regulating the charge voltage applied to said battery, said regulator means including a first Zener diode connected in parallel with said current sensing means and said battery, a second Zener diode having a lower breakdown voltage than said first Zener diode, a switch, said second Zener diode and said switch connected in series, said series combination connected in parallel with said first Zener diode, and means controlled by said current sensing means for closing said switch when said current sensed by said current sensing mean reduces to a predetermined value; and
   means for applying the output from said current sensing means to said voltage regulator means for reducing the voltage applied to said battery upon the closing of said switch.

2. Apparatus as claimed in claim 1 wherein the breakdown voltage value of said first Zener diode is equal to the nominal voltage of said battery and the breakdown voltage of said second Zener diode is equal to the open circuit voltage of said battery.

3. Apparatus as claimed in claim 2 wherein said predetermined value is a current value which occurs when said battery reaches about 95% of full charge.

4. Apparatus for controlling the charging of a battery comprising:
   current sensing means connected in series with said battery for sensing the rate of charge applied to said battery and generating an output signal in accordance therewith;

a charge source shunting the series combination of said current sensing means and said battery;

voltage regulator means shunting said charge source for regulating the charge voltage applied to said battery; and means for applying the output from said current sensing means and said shunt regulator for controlling a trigger circuit connected between said current sensing means and said shunt regulator for controlling said shunt regulator to reduce said charge voltage when the current sensed by said current sensing means reduces to a predetermined value.

References Cited

UNITED STATES PATENTS

| 2,910,626 | 10/1959 | Koros | 317—16 |
| 3,201,681 | 8/1965 | Van Wilgen et al. | 323—20 |
| 3,312,889 | 4/1967 | Gold | 320—54 X |

JOHN F. COUCH, *Primary Examiner.*

STANLEY WEINBERG, *Assistant Examiner.*

U.S. Cl. X.R.

320—40; 323—8

UNITED STATES PATENT OFFICE
CERTIFICATE OF CORRECTION

Patent No. 3,426,263                                                      February 4, 1969

Thomas J. Hennigan et al.

It is certified that error appears in the above identified patent and that said Letters Patent are hereby corrected as shown below:

Column 1, lines 22 and 23, cancel "yet insufficient to keep the battery charged --.

Signed and sealed this 24th day of March 1970.

(SEAL)
Attest:

Edward M. Fletcher, Jr.                              WILLIAM E. SCHUYLER, JR.
Attesting Officer                                                  Commissioner of Patents